J. H. MULHOLLAND.
SPOON MOLDING MACHINE.
APPLICATION FILED MAY 13, 1920.
1,372,535.
Patented Mar. 22, 1921.
5 SHEETS—SHEET 3.
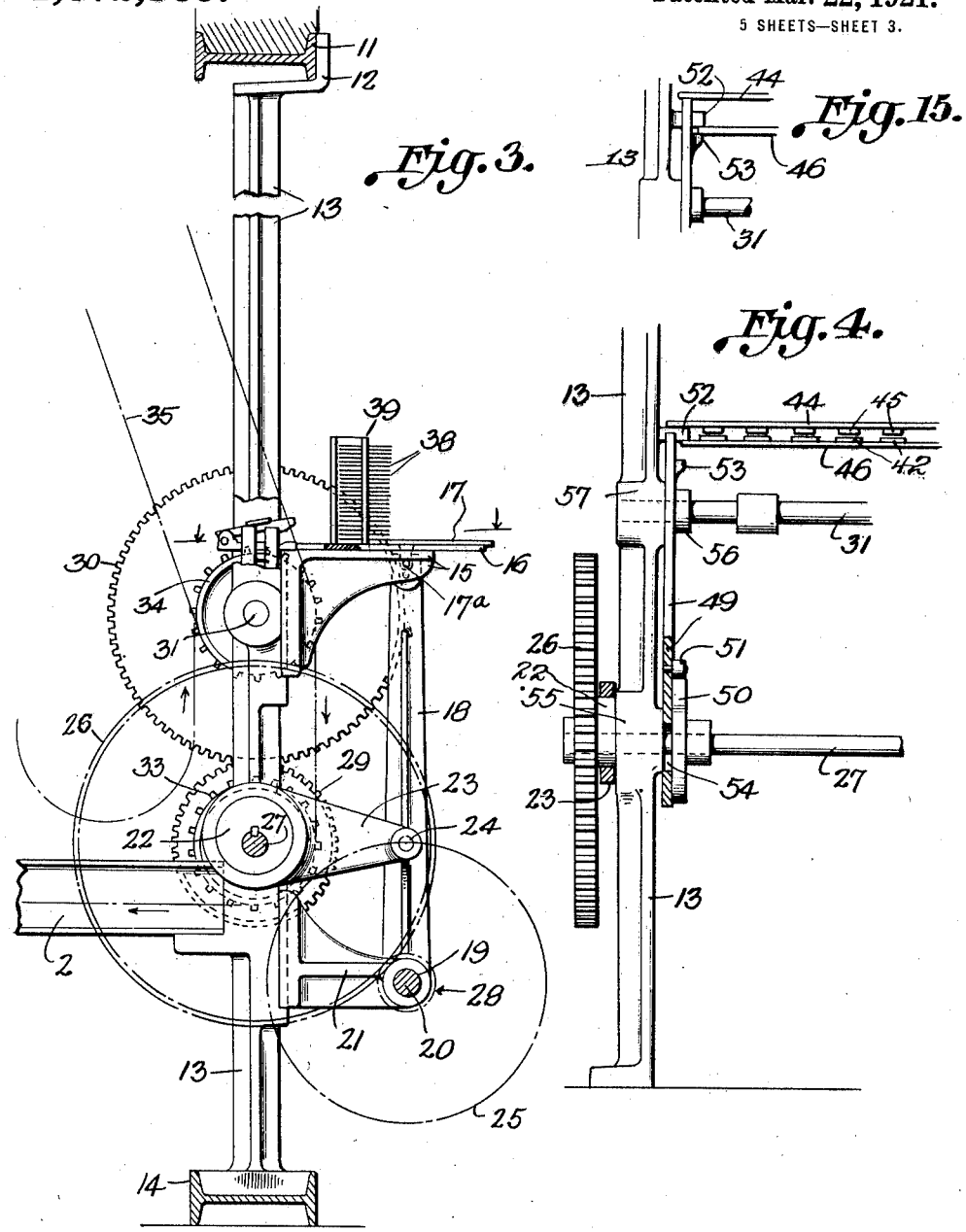
INVENTOR.
John A. Mulholland
BY
ATTORNEY.

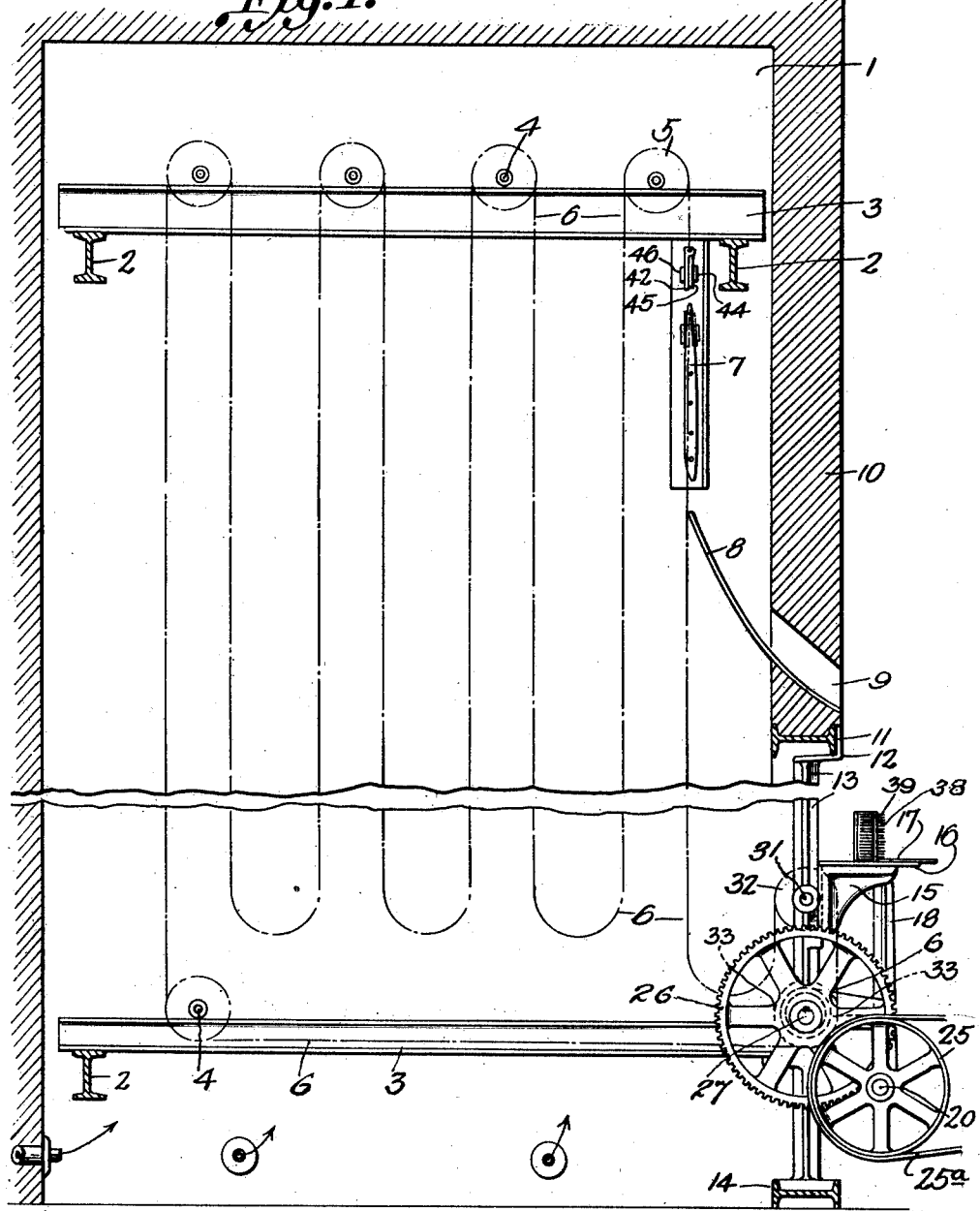

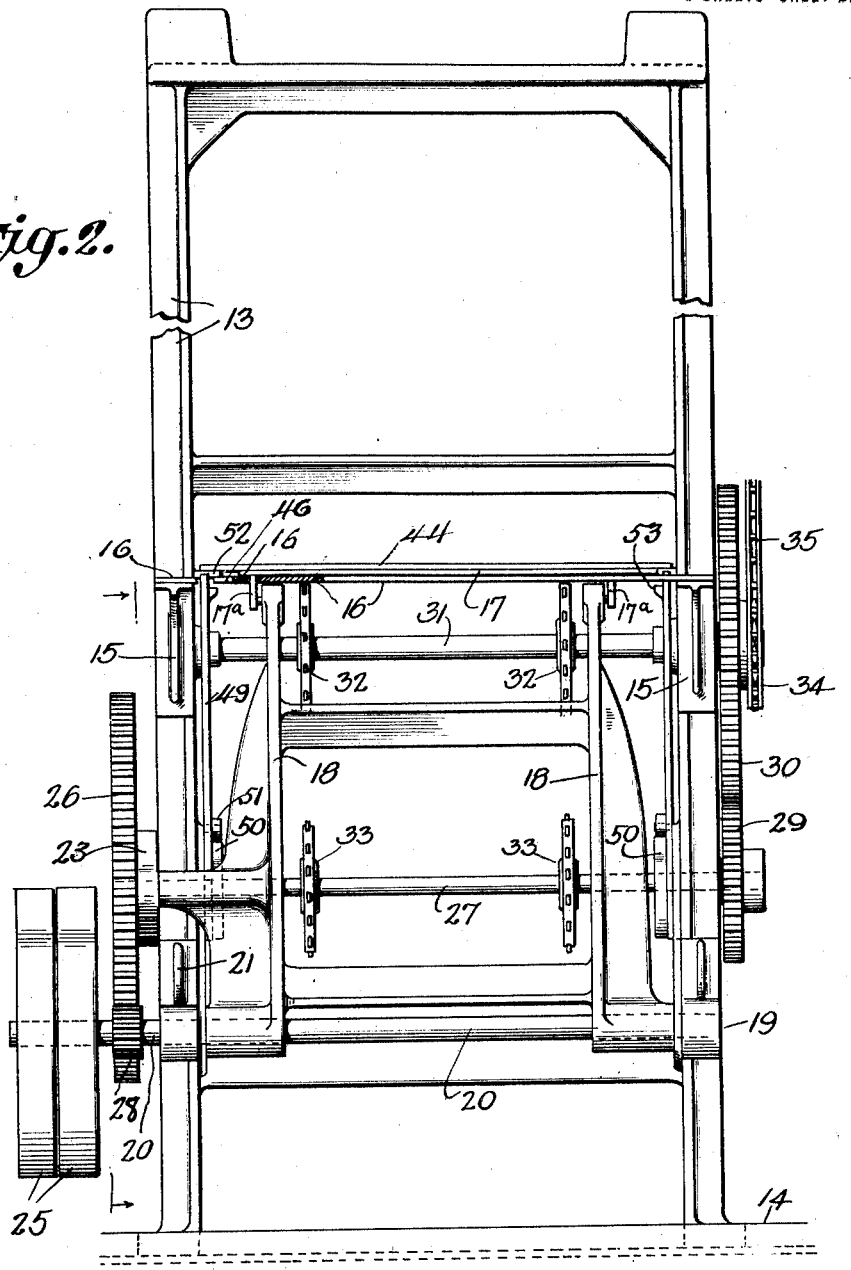

J. H. MULHOLLAND.
SPOON MOLDING MACHINE.
APPLICATION FILED MAY 13, 1920.
1,372,535.
Patented Mar. 22, 1921.
5 SHEETS—SHEET 4.
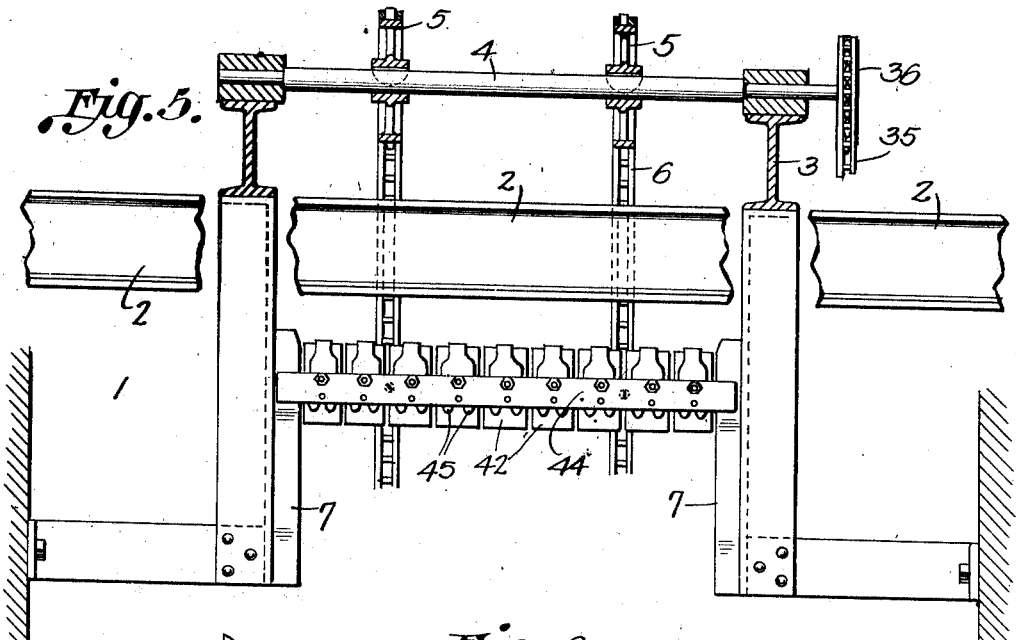
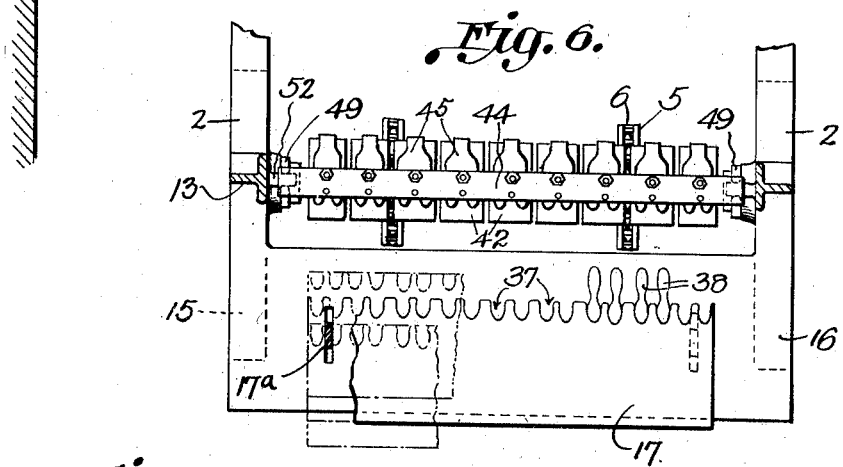
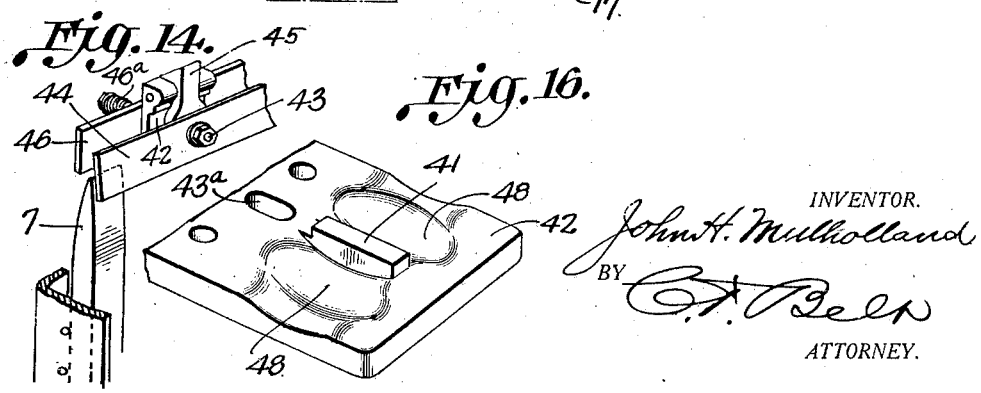
INVENTOR.
John H. Mulholland
BY
ATTORNEY.

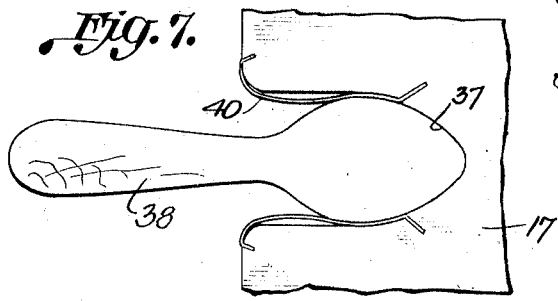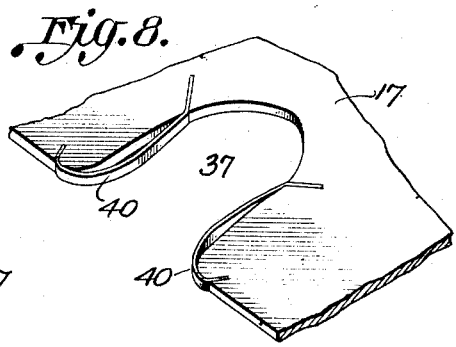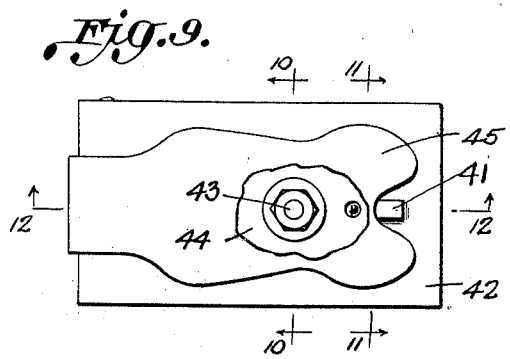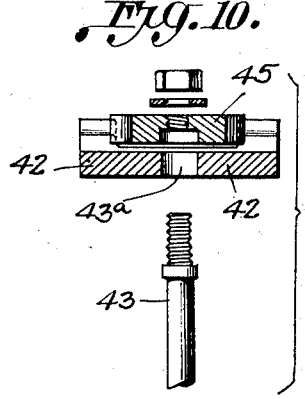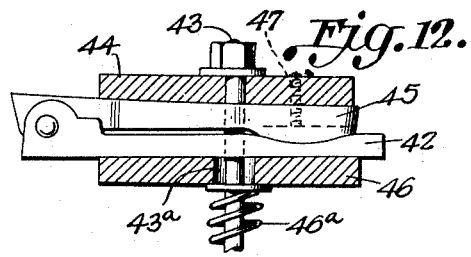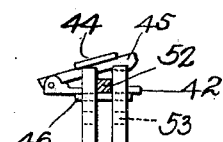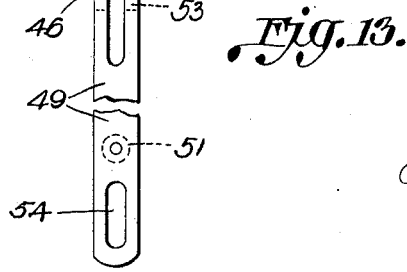

UNITED STATES PATENT OFFICE.

JOHN H. MULHOLLAND, OF PHILADELPHIA, PENNSYLVANIA.

SPOON-MOLDING MACHINE.

1,372,535.  Specification of Letters Patent.  Patented Mar. 22, 1921.

Application filed May 13, 1920. Serial No. 381,158.

*To all whom it may concern:*

Be it known that I, JOHN H. MULHOLLAND, a citizen of the United States, residing at Philadelphia, in the county of Philadelphia and State of Pennsylvania, have invented certain new and useful Improvements in Spoon-Molding Machines, of which the following is a specification.

This invention relates to the class of molding machines in which is comprised spoon shaping and molding apparatus, and this invention pertains especially to an apparatus for pressing and drying wooden spoon blanks into conventional spoon shape.

The object of the invention is to provide a machine or apparatus having such construction and arrangement as to afford means for taking thereinto a plurality of wooden spoon blanks, pressing the blanks into spoon shape during their conveyance through an oven, and discharging the molded spoons from the oven in finished condition.

A further object of the invention is to provide a novel and peculiar spoon molding device and means for automatically feeding the molds containing the spoon blanks through an oven, and means for automatically discharging the finished spoon from the oven during the induction of spoon blanks into the oven.

A still further object of the invention is to provide novel and peculiar devices for feeding the spoon blanks into the compressors or molds which are mounted on an endless carrier traveling within an oven, and means for opening the molds for discharging the finished spoons from the molds and from the oven.

An object still further of the invention is to provide novel and peculiar mechanism for collecting, holding and discharging wooden spoon blanks into compressing molds during the successive passage of the molds adjacent to such mechanism and during the discharge of finished spoons from preceding molds.

Various other objects, advantages and improved results are attainable in the manufacture and practical application of the invention, now to be fully described and set up in the claims to follow.

In the accompanying drawings forming part of this application:—

Figure 1 is a sectional view of an oven partly broken away, showing the principal operating mechanism in side elevation.

Fig. 2 is a front view partly broken away showing the operating mechanism.

Fig. 3 is a side elevation, partly broken away, of the operating mechanism, and showing a battery of molds open for receiving spoon blanks.

Fig. 4 is a sectional front elevation of part of the operating mechanism, partly broken away, and showing part of a battery of compressing molds as in closed position.

Fig. 5 is a sectional elevation, partly broken away, showing in top view a battery of molds.

Fig. 6 is a similar view showing the spoon blank holder.

Fig. 7 is a detail plan view of part of a blank holder showing a spoon held therein.

Fig. 8 is a perspective view of part of a blank holder.

Fig. 9 is a detail top view of one of the compressing molds.

Fig. 10 is a cross section taken on the dotted line 10 . . . 10 Fig. 9.

Fig. 11 is a similar view taken on the dotted line 11 . . . 11 Fig. 9.

Fig. 12 is a section taken on the dotted line 12 . . . 12 of Fig. 9;

Fig. 13 is a detail side view of the lifting lever as opening the molds to receive the blanks.

Fig. 14 is a perspective view of one end of the mold bars showing the shoe for opening molds to discharge the finished spoons.

Fig. 15 is an edge view of a lifting lever in raised position as holding the mold bars open.

Fig. 16 is a detail perspective view of part of the female member of the mold clamp.

The same reference characters denote the same parts throughout the several views of the drawings.

In carrying out my invention, I employ an oven 1, of suitable size, maintained at uniform heat by suitable heat supply, and fixed I beams 2 in the upper and the lower portions of the oven for supporting similar beams 3, upon which are journaled shafts 4 having sprocket wheels 5 for endless sprocket chains 6. The oven is provided with a wedge-shaped shoe or opener 7 adjacent to and above a chute 8 extending through a spoon discharge opening 9 in the front wall 10 of the oven, and this wall is supported below said opening by an I beam 11 engaging an angle bar 12 on the upper end of standards 13 having base beam supports 14, so as to leave this portion of the oven open. Brackets 15 are secured to and extend forward from the standards 13, for supporting a table 16 upon which is mounted a slidable feed plate 17, hereinafter more particularly referred to, and said plate is connected as at 17ª, with and operated by a pair of levers 18 pivoted at 19 on a shaft 20, journaled in brackets 21 secured to and projecting from the standards 13. The levers 18 are operated by an eccentric 22 having a strap 23 to which the said levers 18 are fulcrumed as at 24. The shaft 20 is operated by shifting pulleys 25 and a belt 25ª, driven by suitable motive power, and the eccentric is operated by a gear 26 to which the eccentric is attached, and the gear 26 is mounted on one end of a shaft 27 and meshes with a pinion 28 on the driven shaft 20. The other end of the shaft 27 has a pinion 29 meshing with a gear 30 on a shaft 31 for driving the latter, and these shafts are provided, respectively, with sprocket wheels 32 and 33 corresponding with the sprocket wheels 5 on the shafts 4. One end of the shaft 31 has a sprocket wheel 34 for operating a driving sprocket chain 35 working over a sprocket wheel 36 on the outer end of the forward one of the upper shafts 4.

The inner edge of the feed plate 17 has a plurality of cut outs forming collecting pockets 37 for the bowl portion of spoon blanks 38 which are composed of thin flat wood stamped or cut into spoon shape while the wood is wet preparatory to stacking in the magazine 39 supported on the table 16. The side walls of the cut outs or pockets 37 of the plate 17 are provided with plate springs 40 for temporarily holding the bowl portion of the spoon blanks in the pockets, and these pockets pick up or remove the blanks successively in batteries from the magazine by reason of the inward movement of the table 16 and the plate 17, and said movement is such as to discharge the spoon blanks from their pockets by reason of the edge of the plate 17 between the pockets suddenly striking a lug 41 on the inner face of the female member 42 of the molding clamps, now to be particularly described. There is a plurality of batteries of these clamps, each battery being mounted between a pair of bars by means of a bolt 43 secured to the top bar 44 of said pair of bars by a suitable nut, and said bolt extends through the male and female clamping members 45 and 42 respectively and through the bottom bar 46 of said pair of bars by way of slots 43ª. The top bar 44 has an additional fastening, as at 47, to the upper or male member of the clamp, and a spiral spring 46ª is mounted on the bolt 43 for normally closing the clamping members 42 and 45, with a spoon blank therebetween. Each clamp comprises a pair of molds shaped so as to press the bowl portion of the blanks into spoon-bowl shape, and the lower or female member of the clamps has the lug 41 centrally between the bowl-forming concavities 48, so as to form an abutment for the inner edge of the feed plate 17. Obviously the impact of the plate edge against said lugs is such as to dislodge the blanks from the plate into the molding clamps, and simultaneously with such dislodgment the clamping members close upon the blanks, as will be hereinafter further explained.

The clamp-carrying bars are mounted at intervals on the endless chains 6 by securing the bottom bar 46 to said chains, so that these bars will not interfere with the chain sprocket wheels, and the ends of the top bar 44 project beyond the ends of the bottom bar 46 so that said projecting ends will ride over the wedge-shaped shoe 7 and thereby spread the bars apart so as to open the molding clamps, for discharging the molded spoons by way of the chute 8 and the discharge opening 9. The batteries of clamping molds are spaced apart on the chains with respect to the oscillating movement of the feed lever 18 so that the inward movement of the blank-holding plate will be in time to discharge the blanks into this battery of molds when the latter arrives in horizontal plane with said plate, and upon such arrival of the molds they are automatically opened by lift levers 49 which are raised into engagement with the projecting ends of the mold-carrying bars by an eccentric 50 on the shaft 27, and the eccentric is engaged by a roller 51 on the levers 49. A lug 52 projects from the face of the standards 13 in the path of the travel of the clamping bars 44 and 46 so as to intersect the ends of said bars when the latter bring the empty clamping molds into position to receive the spoon blanks, and in said position the forked end of the lift levers 49, which straddles the said lug 52, engages the projecting ends of the bar 44 for opening the clamping molds which thereupon receive the spoon blanks, and said molds are then closed by pressure of the spring 46ª when the levers 49 are retracted by the eccentric 50 immediately upon the deposit of the spoon blanks into the mold clamps. Lugs 53 on the forked end of the levers 49 engage under the ends of the bar 46 and hold this bar against the under side of the lug 52 while the forked end of the lever 49 is holding the bar 44 in raised position which opens the battery of clamping molds. The projecting lugs 52 are so located as to position the battery of molds in open position for receiving the spoon blanks from the blank-holding plate 17 while the lever 49 and lugs 52 and 53 temporarily hold the mold-carrying bars 44 and 46 spread apart with the mouth of the molds open opposite the said plate 17. The lower end of the lifting levers 49 have a slot 54 fitting the shaft 27 between the eccentrics 50 and the shaft bearing 55, and the forked end of these levers works over the shaft 31 between a collar 56 and the shaft bearing 57 so as to permit vertical movement of said levers without permitting lateral movement thereof.

Obviously the speed of the endless chains and the spacing apart of the mold batteries thereon is such as to successively carry the mold batteries into position for the discharge of the spoon blanks from the blank feeding plate 17 into the molds where the blanks are clamped and carried downwardly and laterally under the lower sprocket shaft, then upwardly over the inner one of the upper sprocket shaft, whence, by the weight of the bars and molds, the chains run downwardly through the oven and upwardly over the next sprockets, and successively over the remaining upper sprockets dropping adjacent to the bottom of the oven after leaving each of said sprockets, whereby the molds containing blanks are carried upwardly and downwardly repeatedly within the oven so as to dry the spoon blanks during the molding thereof preparatory for discharging the molded spoons, in finished condition from the oven.

The tension of the springs 46ᵃ may be changed to vary the pressure of the molding clamps as desired or as occasion may demand, and the driving gear may be varied according to the speed desired for the travel of the mold-carrying chains.

It will be observed that the various working parts of the machine coöperate automatically and simultaneously by means of the same driven gearing, that the machine is started and stopped by shifting the driving belt, and that it is only necessary to keep the magazine 39 supplied with spoon blanks for continuous operation of the machine.

Obviously various changes and arrangements in and of the parts of the machine may be found expedient in the manufacture, development and practical working of the machine, therefore I do not wish to limit myself in these respects, nor to the size, capacity and material employed, but reserve the right to avail myself of the full scope of this invention as set up in the appended claims.

Having thus described my invention what I claim as new and desire to secure by Letters Patent is:—

1. In a machine for molding spoons, a driven gearing, endless chains operated by the gearing, a plurality of batteries of spoon molding clamps secured to the chains, an eccentric operated by the gearing, a lift lever operated by the eccentric for opening the clamps to receive the spoon blanks, each battery of clamps being mounted between a pair of carrying bars, a bolt extending through one of the clamp members and through said bars, one of said bars having a spring-equipped additional connection with one of the clamp members for normally closing the clamp members with a spoon blank therebetween, an oscillating lever operated by the gearing, and a slidable spoon blank holder operated by the oscillating lever for feeding the blanks into the molding clamps.

2. In a machine for molding spoons, a plurality of endless driven chains, a plurality of clamping bars arranged in pairs and mounted on the chains, a battery of spoon molding clamps between the bars of each pair, springs for normally closing the clamps, and lift levers for engaging the ends of one of said bars to open the clamps, each spoon-molding clamp comprising a pair of molds adapted to impress or form the bowl-shaped concavities in the spoon-blanks, one of said clamp members being provided with a lug between the bowl-forming concavities to form an abutment for engagement of the blank-feeding plate therewith.

3. In means for opening spoon clamping molds, a pair of bars, conveyers to which the bars are secured, spring controlled clamping molds secured to and between the bars, means stationed in the path of travel of the bars and intervening the ends of the bars, lifting levers which straddle said intervening means and engage the ends of one of said bars while the ends of the other bar engage under said means for spreading the bars apart and thereby opening the mold clamps for receiving the spoon blanks, and means for operating the lifting levers.

4. A plurality of batteries of spoon molding clamps, endless conveyers on which the clamps are mounted, springs for normally closing the clamps, driven gearing for propelling the conveyers, lifting levers operated by said gearing for opening the clamps to receive the blanks, a slidable plate for feeding the blanks into the clamps, and an oscillating lever operated by said gearing for sliding the plate, each spoon-molding clamp comprising a hinged-together male and female member, a pair of molds, means for automatically retaining said clamp members normally closed, one of said clamp members having an abutment on its inner face for engagement of the blank-feeding member therewith.

5. A spoon molding clamp comprising a male member and a female member hinged together and forming a pair of molds, a spring for keeping said members normally closed, an abutment on the inner face of the female member, means for opening the clamps, a feed plate for collecting the spoon blanks, and means for operating the plate against the abutment for discharging the blanks into the clamps.

6. A feed device for spoon blanks comprising a plate having edge openings for collecting the blanks, plate springs secured in the openings for temporarily holding the blanks, and means for sliding the plate in a blank feeding operation.

7. In a spoon molding apparatus, a drying oven having a spoon discharge opening, a spoon chute projecting inwardly and upwardly from the opening, endless conveyers passing adjacent to the receiving end of the chute, mold bars secured to the conveyers, spoon clamping molds carried by the bars, shoes secured within the oven centrally above said chute end and in the path of travel of the bars so that the ends of the bars will straddle the shoes and thereby open the molds for discharging the spoons on the chute, the clamping surfaces of said spoon molds being substantially parallel to the tread of the feed belt, and means for operating the conveyers.

8. In a spoon molding apparatus, a drying oven having a spoon discharge opening, standards supporting the oven wall so as to leave the wall open below said opening, a pair of driven shafts journaled in the standards, gearing for transmitting the movement of one shaft to the other, a plurality of shafts within the oven and having sprocket wheels, endless sprocket chains, a plurality of batteries of spoon molding clamps mounted on the chains, said clamps each comprising a male and female member adapted to form the bowl in the spoon blank, a driven shaft geared with said gearing, an oscillating lever operated by said gearing, a spoon blank feeder slidable by the lever, and means operated by said gearing for opening the clamps to receive the blanks simultaneously with the inward movement of said feeder.

9. In a spoon molding apparatus, an oven, endless conveyers propelled within the oven, spoon molds mounted on the conveyers, said spoon molds each comprising a male and female member adapted to compress therebetween the blanks for forming the spoon bowls, means for feeding spoon blanks into the molds during the movement of the conveyers, and means for releasing the molded spoons from the molds during the movement of the conveyers for discharging the spoons from the oven during the feeding of the blanks into the molds.

In witness whereof I hereunto set my hand in the presence of two witnesses.

JOHN H. MULHOLLAND.

Witnesses:
FRED W. MULHOLLAND,
M. H. WATERMAN.